United States Patent
Burke et al.

[11] Patent Number: 6,115,524
[45] Date of Patent: Sep. 5, 2000

[54] OPTICAL WAVEGUIDE ATTENUATING DEVICE AND METHOD FOR PRODUCING THE SAME

[75] Inventors: Gerald E. Burke, Painted Post; Christine L. Hoaglin, Campbell; Carlton M. Truesdale, Corning, all of N.Y.

[73] Assignee: Corning Incorporated, Corning, N.Y.

[21] Appl. No.: 09/113,771

[22] Filed: Jul. 10, 1998

Related U.S. Application Data

[60] Provisional application No. 60/054,410, Jul. 31, 1997.

[51] Int. Cl.[7] ............................................ G02B 6/02
[52] U.S. Cl. .............................. 385/123; 385/141; 65/424
[58] Field of Search ......................... 385/123, 124, 385/141, 142; 65/397, 416, 424

[56] References Cited

U.S. PATENT DOCUMENTS

| | | | |
|---|---|---|---|
| 3,806,570 | 4/1974 | Flamenbaum et al. | 264/66 |
| 4,553,995 | 11/1985 | Chigusa | 65/4.2 |
| 4,881,793 | 11/1989 | Tarbox | 350/96.21 |
| 5,114,738 | 5/1992 | Savage et al. | 427/37 |
| 5,152,819 | 10/1992 | Blackwell et al. | 65/3.12 |
| 5,572,618 | 11/1996 | DiGiovanni et al. | 385/140 |
| 5,633,974 | 5/1997 | Chia | 385/140 |

FOREIGN PATENT DOCUMENTS 0 692 722  1/1996  European Pat. Off. .

OTHER PUBLICATIONS

"Optical Absorption of the Transition Elements in Vitreous Silica", Peter C. Schultz, *Journal of The American Ceramic Society*, vol.57,No.7; pp. 309–313, Jul. 1973.

*Primary Examiner*—John D. Lee
*Assistant Examiner*—Sarah U Song
*Attorney, Agent, or Firm*—Scott S. Servilla; Juliana Agon

[57] ABSTRACT

A method for making an optical attenuating device comprising an optical waveguide having a core doped with a transition metal and a cladding. The transition metal is deposited in the core during a core blankmaking process. The transition metal doped core is exposed to gaseous hydrogen in a furnace to significantly increase the attenuation of the device.

18 Claims, 1 Drawing Sheet

OPTICAL WAVEGUIDE ATTENUATING DEVICE AND METHOD FOR PRODUCING THE SAME

This application claims the benefit of U.S. Provisional Application, Serial No. 60/054,410, filed Jul. 31, 1997 entitled OPTICAL WAVEGUIDE ATTENUATING DEVICE AND METHOD FOR PRODUCING THE SAME, by Gerald E. Burke, Christine L. Hoaglin, and Carlton M. Truesdale.

BACKGROUND OF THE INVENTION

The present invention generally relates to devices which affect the transmission of optical fiber signals. More particularly, the present invention relates to optical waveguide attenuating devices.

In optical fiber communication systems which transmit optical signals over long distances, it is generally desirable to minimize light losses due to absorption and scattering in the optical fibers. In many instances, however, it is necessary to employ optical attenuator devices to reduce the amount of power present in the optical signal.

For example, communication system receivers optimally function within a certain range of an optical input level, and it is therefore necessary to adjust the input level to the desired range. The path attenuation in an optical communication system is a function of fiber length and the fiber attenuation coefficient. Thus, the path attenuation can be adjusted by increasing the fiber length, but this is not practical using low loss fibers. Accordingly, high loss optical fiber attenuators are used to increase the path attenuation where it is impractical to use long lengths of low loss fibers. Attenuators also are utilized to equalize optical signals from different sources, or to simulate the presence of a long low loss line when calibrating an optical component or network.

Fiber attenuators are also used at terminations for the ends of unused optical fibers of devices such as wavelength division multiplexers and star couplers to eliminate unwanted back reflections. The use of fiber attenuators as terminators for unused fibers in star couplers is described in U.S. Pat. No. 5,572,618, which is relied upon and incorporated by reference.

Optical fiber attenuators typically comprise an optical fiber having a core and a cladding, the core including a dopant material which increases the attenuation of the optical fiber. The dopant can be introduced by solution doping transition of rare earth elements into the fiber's core, and the attenuation of the fiber is directly proportional to the dopant concentration and the fiber length. See, for example, U.S. Pat. No. 5,633,974. Solution doping has several disadvantages, however, chiefly that solution doping involves an additional processing step which must be performed after fabrication of the optical fiber.

Another fiber attenuator described in U.S. Pat. No. 4,881,793 involves vapor deposition doping the core of an optical fiber with a variable valency element such as Ti, V, Cr, or Fe, which is partially present in a lower valency state. The presence of the lower valency state is controlled by the amount of oxygen used during the deposition process or by consolidating the preforms in a reducing atmosphere. The attenuations achieved with the fiber described in U.S. Pat. No. 4,881,793 are reported as only reaching about 25 dB/m. In certain applications, such as terminators, it is desirable to provide an attenuator having an attenuation in excess of 100 dB/m.

Accordingly, it would be desirable to provide a method for fabricating an optical attenuating device capable of providing a broad range of attenuations.

SUMMARY OF INVENTION

Applicants have discovered a method for fabricating an optical waveguide attenuating device having an attenuation which can be varied in the range from about 0.5 dB/m to greater than about 5000 dB/m at wavelengths from about 780 nm to about 1600 nm.

One aspect of the present invention includes a method of fabricating an optical waveguide for an optical attenuating device comprising the steps of doping a silica core with a transition metal during a core blankmaking process and exposing the transition metal doped core to gaseous hydrogen. The method of the present invention may further comprise consolidating the doped core, preferably in a consolidation furnace without chlorine drying gas. Preferably, the step of exposing the doped core to gaseous hydrogen occurs after consolidation of the core blank, and more preferably, for embodiments in which the waveguide is an optical fiber, after the core has been formed into a core rod. In one embodiment of the invention, the dopant comprises tungsten.

Another aspect of the present invention comprises an optical attenuating device comprising an optical waveguide, preferably an optical waveguide fiber, having a core doped with tungsten, and a cladding. The tungsten preferably is present in an amount from about 0.1% to about 5% by weight, however, higher concentrations of tungsten may be included. In one aspect of the invention, at least a portion of the tungsten is reduced from an oxidation state of +6 to an oxidation state of +5. The attenuating device of the present invention is operable to produce an attenuation from about 0.5 dB/m to greater than about 5,000 dB/m at wavelengths from about 1300 nm to about 1550 nm. In another aspect, the invention includes an attenuating device including a tungsten doped optical waveguide, preferably a single mode optical waveguide fiber, having a core doped with tungsten and a cladding, with the tungsten doped optical waveguide fiber connected to at least one optical fiber.

Applicants have discovered that the method of the present invention is capable of providing attenuating devices having a broader range of attenuations than the devices which are known to the applicants.

Additional features and advantages of the invention will be set forth in the description which follows, and in part will be apparent from the description, or may be learned by practice of the invention. It is to be understood that both the foregoing general description and the following detailed description are exemplary and explanatory and are intended to provide further explanation of the invention as claimed.

The accompanying drawing is included to provide a further understanding of the invention and are incorporated in and constitute a part of this specification, illustrate one embodiment of the invention and together with the description serve to explain the principles of the invention.

DETAILED DESCRIPTION

Figure 1:
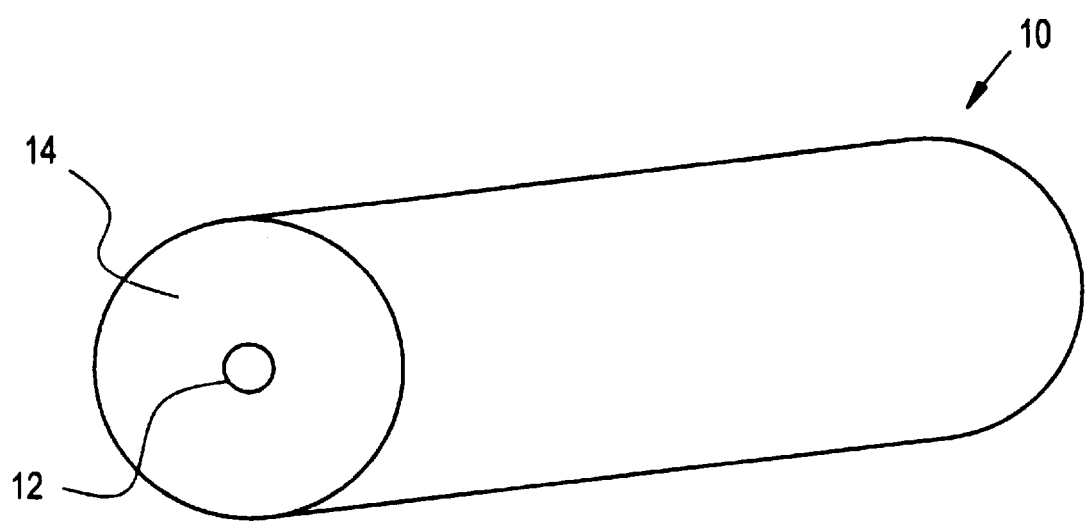
FIG. 1 is a perspective view of an optical waveguide fiber attenuating device constructed in accordance with an illustrative embodiment of the present invention.

Reference will now be made in detail to a preferred embodiment of the invention, an example of which is illustrated in the accompanying drawing. An exemplary embodiment of the optical waveguide attending device of the present invention is shown in FIG. 1 and is designated generally by reference numeral 10.

One aspect of the present invention includes a method of fabricating an optical waveguide 10, preferably a single mode optical waveguide fiber, for an optical attenuating device which comprises forming a core blank doped with a transition metal during a glass core blankmaking process. Useful compounds for forming the glass core blank include metal halides and halide free cyclosiloxane compounds such as, for example, octamethyltetrasiloxane, decamethylcyclopentasiloxane, hexamethylcyclotrisiloxane, and mixtures of these. In another aspect of the invention, the method of introducing the transition metal dopant occurs during the glass core blankmaking process. For example, in an embodiment where tungsten is the dopant, a tungsten gas compound, preferably tungsten hexafluoride, may be introduced during a vapor deposition process. Another aspect of the present invention includes consolidating the core blank, providing a cladding layer around the core blank to create a waveguide preform, consolidating the waveguide preform, and drawing the preform into an optical waveguide fiber.

In embodiments in which the waveguide is an optical fiber, the core blank may be formed into a core rod and the core rod may be exposed to gaseous hydrogen prior to providing the cladding layer around the core. As used in this specification, the term core rod means a glass blank in the shape of a cylinder having a diameter greater than about one millimeter, preferably having a diameter of about 7 millimeters to about 10 millimeter.

The transition metal dopant may be introduced into the core of the optical waveguide during a vapor deposition process such as, for example, an OVD process. For example, to produce a core blank containing between 1% and 4% tungsten dopant, tungsten hexafluoride gas may be delivered from a container through a conduit via a mass flow controller to a delivery manifold of a flame hydrolysis system located before a burner. The flow rate of the tungsten hexafluoride gas may be varied from about 0.05 standard liters per minute to about 0.5 standard liters per minute. A bubbler delivery system may be used to deliver SiCl4 vapor to a burner using an oxygen carrier gas flowing at a rate of about 2 liters per minute. The SiCl4 vapor and the tungsten hexafluoride gas are then combusted at the burner to form a tungsten doped core blank. Alternatively, the doped core blank may be formed by combusting the liquid compounds, as disclosed in copending application Ser. No. 08/767,653, filed on Dec. 17, 1996 and entitled Method and Apparatus for Forming Fused Silica by Combustion of Liquids Reactants, which is incorporated herein by reference.

The doped core blank may be consolidated, preferably in a consolidation furnace without chlorine drying gas. Applicants have found that when tungsten doped core blanks are consolidated in a furnace with chlorine drying gas, the tungsten is stripped out of the core blank during consolidation, resulting in a lower attenuation waveguide. Additionally, waveguides formed from blanks consolidated in a furnace without chlorine drying gas contain hydroxyl groups, which further increases the attenuation of the devices of the present invention. Preferably, the consolidation furnace contains helium flowing at a rate of about 0.9 standard liters per minute to about 40 standard liters per minute.

A consolidated transition metal doped core blank may be drawn into core rod having a diameter of about 7 mm to about 10 mm. The core then may be overclad with silica, consolidated, and drawn into an optical waveguide fiber to form an attenuating device. A waveguide fiber containing about 3.8% tungsten by weight in the core produced an attenuating device having an attenuation of about 50 dB/m at about 1550 nm and about 100 dB/m at about 1300 nm.

Applicants have discovered that the attenuation of a transition metal doped waveguide fiber can be significantly increased by exposing the doped core to gaseous hydrogen. Preferably, the doped core is exposed to gaseous hydrogen by processing a core rod in a furnace containing gaseous hydrogen. Controlling the temperature of the furnace, the pressure of the hydrogen in the furnace, and the amount of time that the cane is exposed to the gaseous hydrogen enables the fabrication of waveguide devices having a broad range of attenuations.

It will be understood that processing the core rod in a furnace containing gaseous hydrogen for longer periods of time will cause a greater portion of the transition metal dopant to be reduced from the higher oxidation state to the lower oxidation state, resulting in higher attenuation. Similarly, increasing the hydrogen pressure in the furnace will increase the rate at which the transition metal element is reduced to a lower oxidation state. For example, processing a core rod containing 3.8% tungsten in a furnace containing gaseous hydrogen at a pressure of 1 atmosphere for 44 hours at a temperature of about 650° C. provided an attenuation of about 750 dB/m at 1300 nm and about 500 dB/m at about 1550 nm in a subsequently produced optical waveguide fiber. Of course, higher attenuations can be achieved by adjusting the process conditions. For any desired attenuation, the optimum temperature, dopant concentration, hydrogen pressure, and duration of treatment can be determined by experimentation.

After the transition metal doped core rod has been processed in the furnace containing gaseous hydrogen, overclad silica may be deposited over the core rod, forming an optical waveguide preform, which may be consolidated and drawn into an optical waveguide fiber. Preferably, the consolidation of the optical waveguide preform occurs in a furnace without chlorine drying.

Referring now to FIG. 1, another aspect of the present invention includes an optical attenuating device 10, shown in this exemplary embodiment as an optical waveguide fiber, preferably a single mode fiber, having a core 12 doped with tungsten and a cladding 14. The waveguide fiber may be formed from a fused silica preform formed by any conventional vapor deposition process, including, for example OVD, MCVD, PCVD, and VAD or by a process involving combustion of liquid reactants such as a siloxane. The amount of tungsten dopant in the core 12 may be present in an amount from about 0.1% to about 5% by weight, although higher concentrations may be included. A higher concentration of tungsten will achieve higher attenuations.

Preferably at least a portion of the tungsten in the core 12 is reduced from an oxidation state of +6 to an oxidation state of +5 by exposing the core 12 to gaseous hydrogen, as described above. Applicants have found that exposing the core 12 to gaseous hydrogen for longer periods of time increases the attenuation of the attenuating device. The devices produced in accordance with the principles of the present invention are operable to produce an attenuation from 0.5 dB/m to greater than about 5000 dB/m at wavelengths from about 780 nm to about 1600 nm. As mentioned above, the attenuation can be controlled by the concentration of tungsten in the core, in addition to the length of time the tungsten core is exposed to gaseous hydrogen and other processing conditions.

In another aspect of the present invention, an optical attenuating device comprises a tungsten doped optical waveguide, preferably a single mode optical waveguide fiber, as shown in FIG. 1, with at least one end of the tungsten doped waveguide connected to an optical fiber (not shown). As will be readily appreciated by those skilled in the art, the devices of the present invention can be used as terminators, wherein one end of the optical attenuating device is connected to the end of an unused optical fiber of devices such as star couplers to eliminate back reflections. In other applications, the attenuating devices of the present invention may be inserted into an existing optical path by splicing the attenuating device between two lengths of optical fiber.

It will be appreciated, of course, that any suitable means for coupling or connecting may be utilized to couple the attenuating waveguide fibers of the present invention to one or more fiber ends. The specific type of coupler or connector will generally depend upon the selected application.

Of course, the invention is not limited to the embodiments described above and shown which have only been given by way of example. It will be apparent to those skilled in the art that various other modifications and variations can be made to the device and method of the present invention without departing from the spirit or scope of the invention. For example, while it is preferred that the transition metal doped core is exposed to hydrogen by processing the doped core rod in a furnace containing gaseous hydrogen prior to depositing the silica overclad layer, it is within the scope of this invention to deposit the silica overclad layer over the tungsten doped cane, consolidate the optical waveguide preform, and then process the preform in a furnace containing gaseous hydrogen to expose the core to gaseous hydrogen. Thus, it is intended that the present invention cover various modifications and variations of this invention as defined by the appended claims.

What is claimed is:

1. A method of fabricating an optical waveguide for an optical attenuating device comprising the steps of:

doping a silica core with a transition metal during a core blankmaking process, to form a transition metal doped core, exposing the transition metal doped core to gaseous hydrogen prior to application of any cladding; and applying cladding to said transition metal doped core.

2. The method as recited in claim 1 further comprising the step of consolidating the doped core.

3. The method as recited in claim 2 wherein the step of consolidating the doped core is performed in a consolidation furnace without chlorine drying gas.

4. The method as recited in claim 2 further comprising the step of exposing the doped silica core to gaseous hydrogen at a temperature of at least about 100° C.

5. The method as recited in claim 3 wherein the dopant comprises tungsten.

6. The method as recited in claim 5 further comprising the step of introducing tungsten hexafluoride gas during the core blankmaking process.

7. The method as recited in claim 6 further comprising the step of exposing the tungsten doped core to gaseous hydrogen at a pressure of at least about 1 atmosphere and at a temperature of about 625° C. to about 690° C. for at least about 20 hours.

8. The method as recited in claim 7 wherein the tungsten is present in an amount from about 0.1% to about 5% by weight.

9. An optical attenuating device comprising an optical waveguide having a core doped with tungsten and a cladding wherein the optical waveguide has an attenuation of at least about 100 dB/m at wavelengths ranging from about 1300 nm to about 1600 nm.

10. The optical attenuating device as recited in claim 9, wherein at least a portion of the tungsten is reduced from an oxidation state of +6 to an oxidation state of +5.

11. The optical attenuating device as recited in claim 10 wherein the tungsten is present in amount of about 0.1% to about 5% by weight.

12. The optical attenuating device of claim 9 that is connected to at least one optical fiber.

13. The optical attenuating device as recited in claim 9 wherein the tungsten doped optical waveguide fiber is a single mode fiber.

14. An optical waveguide that is an optical attenuating device, the optical waveguide made from the method comprising the steps of:

doping a silica core with a transition metal during a core blankmaking process to form a transition metal doped core, exposing the transition metal doped core to gaseous hydrogen prior to application of any cladding layer; and applying said cladding layer to said transition metal doped core, such that the optical waveguide has an attenuation of at least about 0.5 dB/m at wavelengths ranging from between about 780 nm to about 1600 nm.

15. The optical attenuating device of claim 14 wherein the transition metal is tungsten.

16. The optical attenuating device of claim 15 wherein at least a portion of the tungsten is reduced from a higher oxidation state of +6 to a lower oxidation state of +5.

17. The optical attenuating device of claim 14 wherein the optical waveguide is a single mode fiber.

18. The optical attenuating device of claim 14 wherein the attenuation of the optical waveguide is at least about 5,000 dB/m at wavelengths which range between about 1300 nm to about 1550 nm.

* * * * *